US010023115B2

(12) United States Patent
Kelly

(10) Patent No.: US 10,023,115 B2
(45) Date of Patent: Jul. 17, 2018

(54) AUTONOMOUS VEHICLE HANDOFF ALERT

(71) Applicant: Ford Global Technologies, LLC, Dearborn, MI (US)

(72) Inventor: Tyler Kelly, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/267,249

(22) Filed: Sep. 16, 2016

(65) Prior Publication Data
US 2018/0079358 A1   Mar. 22, 2018

(51) Int. Cl.
*B60R 25/10* (2013.01)
*B60Q 9/00* (2006.01)
*B60N 2/44* (2006.01)
*G08B 6/00* (2006.01)
*B60N 2/90* (2018.01)

(52) U.S. Cl.
CPC ............. *B60Q 9/00* (2013.01); *B60N 2/44* (2013.01); *B60N 2/90* (2018.02); *G08B 6/00* (2013.01); *B60N 2002/4485* (2013.01); *B60N 2002/981* (2018.02)

(58) Field of Classification Search
CPC ......... B60W 50/14; B60W 2050/0025; B60W 50/0073; B60W 2050/0096; B60W 2050/0072; B60K 28/06; G05D 1/0061
USPC ............ 340/438, 457; 701/1, 7, 22, 23, 117; 180/65.285, 65.21
See application file for complete search history.

(56) References Cited

U.S. PATENT DOCUMENTS

| 6,445,303 | B1 | 9/2002 | Aryeh | |
|---|---|---|---|---|
| 9,235,211 | B2 | 1/2016 | Davidsson et al. | |
| 2009/0212974 | A1* | 8/2009 | Chiba | B60Q 9/006 340/932.2 |
| 2015/0070160 | A1* | 3/2015 | Davidsson | B60W 50/14 340/457 |
| 2015/0307022 | A1* | 10/2015 | Nelson | B62D 1/046 701/36 |
| 2017/0021762 | A1* | 1/2017 | Daman | B60Q 9/00 |

FOREIGN PATENT DOCUMENTS

| DE | 102006016185 A1 | 10/2007 |
|---|---|---|
| DE | 102012200248 A1 | 7/2013 |
| DE | 102013018966 A1 | 5/2015 |
| DE | 102015012119 A1 | 5/2016 |
| EP | 1939061 A1 | 7/2008 |

* cited by examiner

*Primary Examiner* — Joseph Feild
*Assistant Examiner* — Sharmin Akhter
(74) *Attorney, Agent, or Firm* — Frank A. MacKenzie; Bejin Bieneman PLC

(57) ABSTRACT

A vehicle alert system includes a processor programmed to receive a handoff request indicating a transition of a host vehicle from an autonomous mode of operation to a non-autonomous mode of operation. The processor is further programmed to output a notification signal in response to receiving the handoff request. A vehicle component is configured to deliver an electrical current to a vehicle driver in response to the notification signal.

17 Claims, 5 Drawing Sheets

AUTONOMOUS VEHICLE HANDOFF ALERT

BACKGROUND

Autonomous vehicles automate certain driving-related tasks. Fully autonomous vehicles can control all steering, braking, and throttle during a trip. Partially autonomous vehicles can provide limited control over steering, braking, and throttle under particular circumstances, such as during a park-assist maneuver.

DETAILED DESCRIPTION

Figure 1:
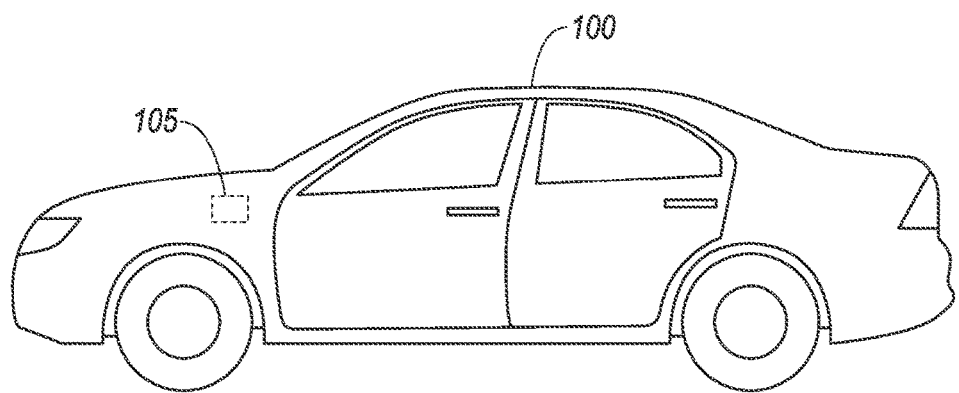
FIG. 1 illustrates an example autonomous vehicle with a vehicle alert system to alert a vehicle driver that the autonomous vehicle transitioning from an autonomous mode of operation to a non-autonomous mode of operation.

With reference to the Figures, wherein like numerals indicate like parts throughout the several views, autonomous vehicles may, under certain circumstances, transfer some or all vehicle control back to a vehicle driver. For example, a fully autonomous vehicle may transfer control back to the vehicle driver if the vehicle encounters a situation that it is not equipped to handle. Partially autonomous vehicles may return control to the vehicle driver when a particular maneuver is complete. This transfer of control may be referred to as a handoff procedure, or simply a "handoff."

When a host vehicle 100 is operating in an autonomous mode of operation, the vehicle driver may be otherwise occupied, e.g., resting, reading, conversing with other occupants of the host vehicle, watching a movie, etc. Depending on the circumstances, the vehicle driver may not be prepared to assume manual control of the host vehicle 100, i.e., for the host vehicle 100 to transition from an autonomous mode of operation to a non-autonomous mode of operation.

Accordingly, the host vehicle 100 may alert the vehicle driver that the host vehicle 100 is transitioning from the autonomous mode of operation to the non-autonomous mode by, e.g., delivering an electrical current to the vehicle driver using a vehicle component 110, such as a steering wheel assembly 165. The host vehicle 100 may also assess the vehicle driver's readiness for the handoff, and to permit the handoff according to certain conditions, e.g., if the vehicle driver's right and left hand are in physical contact with a steering wheel 170. In addition, the host vehicle 100 may deliver an electrical current to the vehicle driver using a second vehicle component 115, e.g., a vehicle seat assembly 185.

As illustrated in FIG. 1, the host vehicle 100 includes a vehicle alert system 105 to alert the vehicle driver before the transition from the autonomous mode of operation to the non-autonomous mode of operation, as discussed further below.

The host vehicle 100 is an autonomous vehicle that operates in an autonomous (e.g., driverless) mode, a partially autonomous mode, and/or a non-autonomous mode. When operating in the autonomous mode, the host vehicle 100 at least partially controls various vehicle subsystems associated with controlling steering, braking, and accelerating. When operating in a non-autonomous mode, the vehicle driver may handle the steering, braking, and accelerating via driver inputs provided to, e.g., a steering wheel, a brake pedal, and an accelerator pedal, respectively.

Although illustrated as a sedan, the host vehicle 100 may include any passenger or commercial automobile such as a car, a truck, a sport utility vehicle, a crossover vehicle, a van, a minivan, a taxi, a bus, etc.

Figure 2:
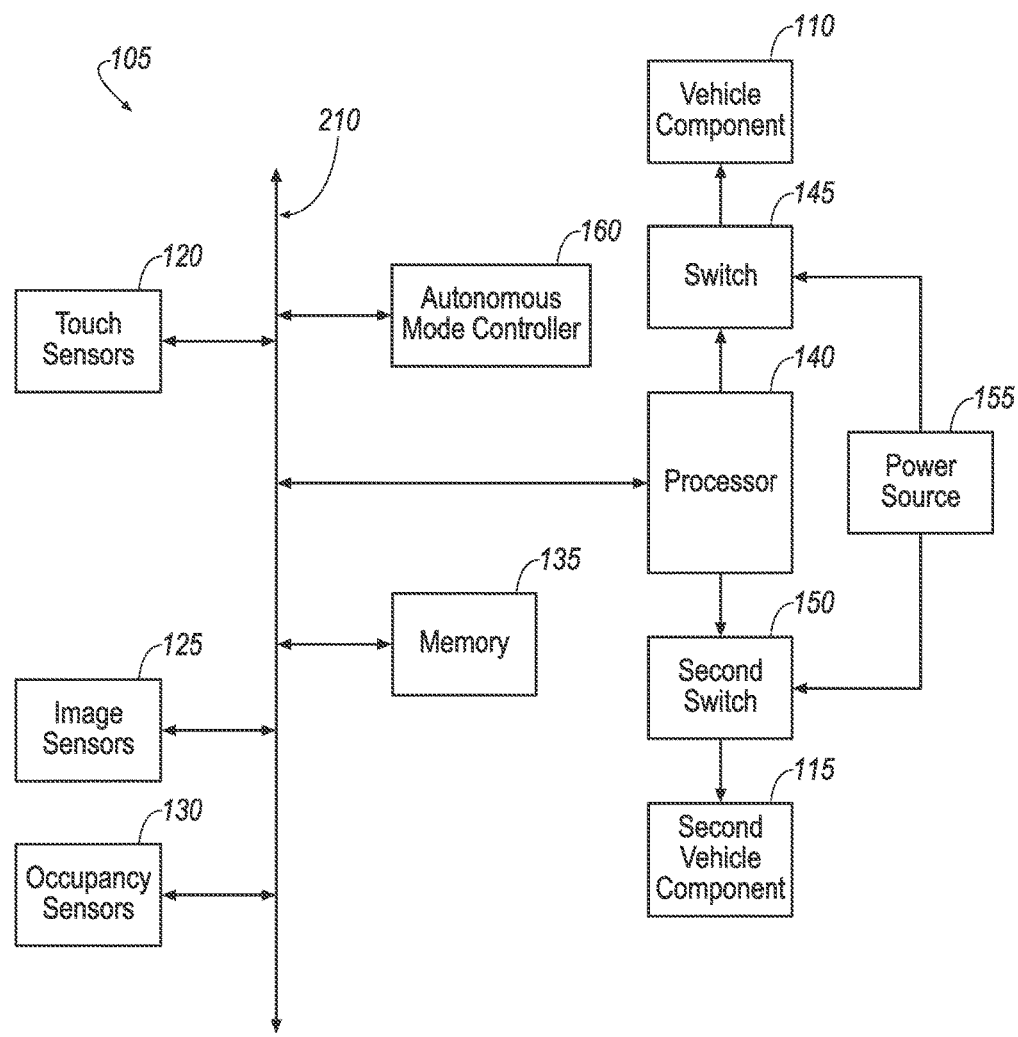
FIG. 2 is a block diagram showing example components of the vehicle alert system of FIG. 1.

Referring to FIG. 2, the vehicle alert system 105 may include or work in cooperation with a vehicle component 110, a second vehicle component 115, sensors, such as touch sensors 120, an image sensor 125 and an occupancy sensor 130, a memory 135, a processor 140, a switch 145, a second switch 150, a power source 155, and an autonomous mode controller 160. Alternatively, the vehicle alert system 105 may include a subset of these or other components.

Figure 3:
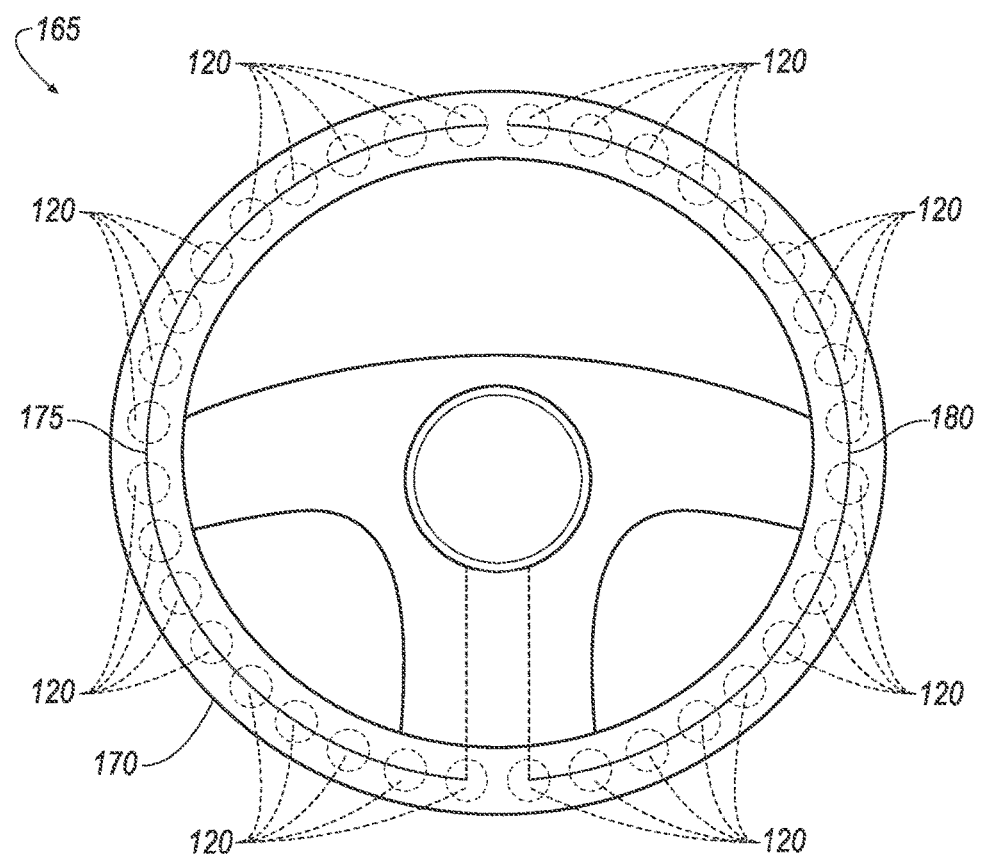
FIG. 3 is a front view of a steering wheel assembly including electrical leads and a plurality of touch sensors.
Figure 4:
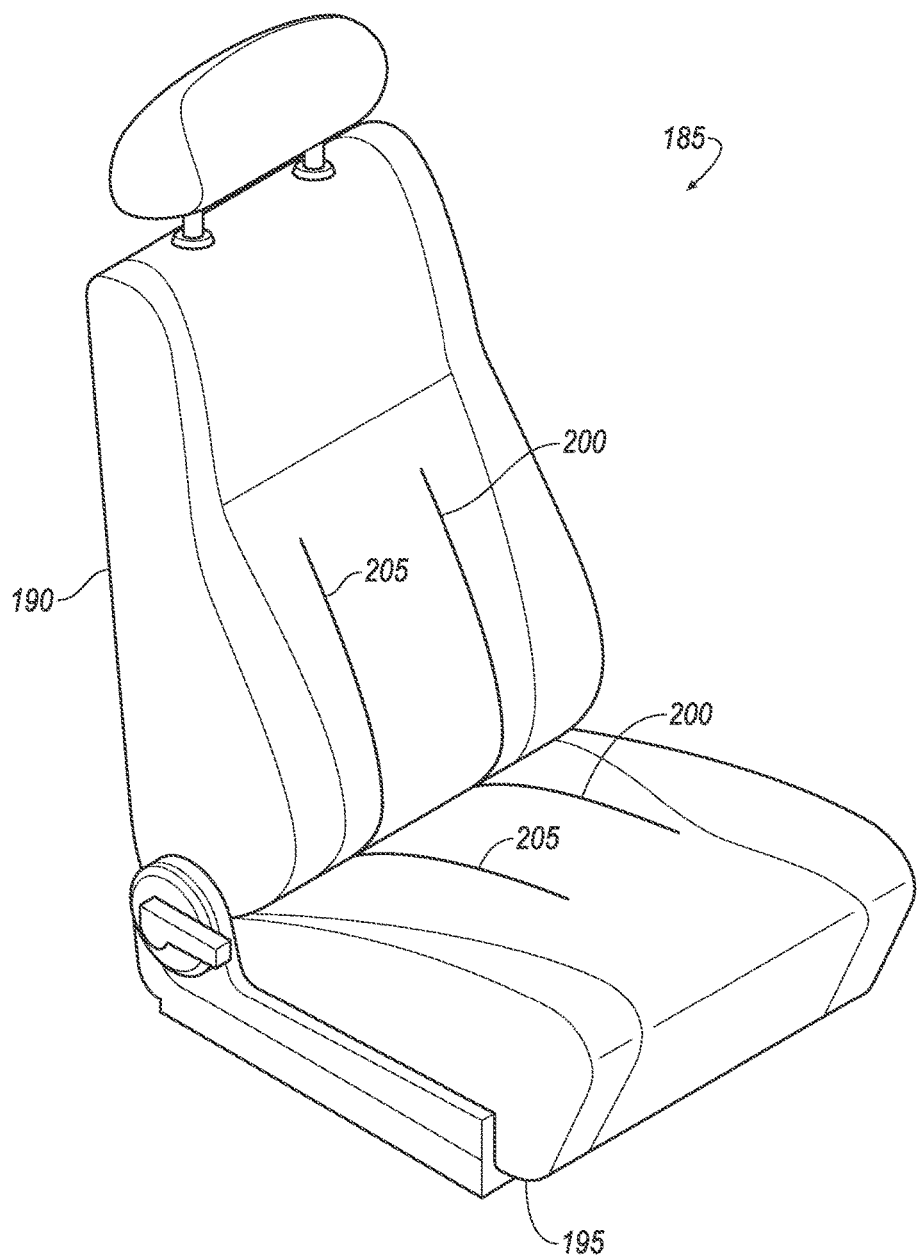
FIG. 4 is a perspective view of a vehicle seat assembly including electrical leads.

In one possible implementation, the vehicle component 110 is a steering wheel assembly 165, as shown in FIG. 3, and the second vehicle component 115 is a vehicle seat assembly 185, as shown in FIG. 4. Although the steering wheel assembly 165 and the vehicle seat assembly 185 are generally referred to as the vehicle component 110 and the second vehicle component 115, respectively, those identifications are for clarity purposes only. It is to be understood that the vehicle seat assembly 185 could be identified as the vehicle component 110, and the steering wheel assembly 165 as the second vehicle component 115.

The steering wheel assembly 165 includes a steering wheel 170. The steering wheel 170 can include a first electrically conductive lead 175 and a second electrically conductive lead 180 spaced from the first electrically conductive lead 175. The first and the second electrically conductive leads 175, 180 may be disposed on the steering wheel 170, and/or at least partially embedded in the steering wheel 170. The first and second electrically conductive leads 175, 180 can extend at least partially around a periphery of the steering wheel 170, and are arranged such that a left hand of the vehicle driver can physically contact one of the first and the second electrically conductive leads 175, 180, and a right hand of the vehicle driver can physically contact the other of the first and the second electrically conductive leads 175, 180. The first and the second electrically conductive leads 175, 180 can be formed of any electrically conductive material, including metal, electrically conductive plastic, etc.

Alternatively, the first and second electrically conductive leads 175, 180 can be spaced from each other, with the first and second electrically conductive leads 175, 180 disposed on and extending around a circumference of the steering wheel 170. Thus, the steering wheel 170 can deliver the electrical current to the vehicle driver if one of the right hand or the left hand of the vehicle driver is physically contacting the first and second electrically conductive leads 175, 180, as discussed further below.

The vehicle seat assembly 185 includes a seat back 190 and a seat bottom 195. A first electrically conductive lead 200 extends at least partially through the seat back 190 and/or the seat bottom 195, and a second electrically conductive lead 205 extends at least partially through the seat back 190 and/or the seat bottom 195, and is spaced from the first electrically conductive lead 200. The first and second electrically conductive leads 200, 205 could be located on a surface of the seat back 190 and/or seat bottom 195, and/or at least partially embedded in the seat back 190 and/or seat bottom 195, such that the vehicle driver is in physical contact with the first and second electrically conductive leads 200, 205 when the vehicle driver is seated in the vehicle seat assembly 185. The first and second electrically conductive leads 200, 205 can be formed of any electrically conductive material, including metal, electrically conductive plastic, etc.

The touch sensors 120 are implemented via chips, circuits or other electronic components that can detect whether the right hand of the vehicle driver is physically contacting one of the first electrically conductive lead 175 and the second electrically conductive lead 180 of the steering wheel 170, and the left hand of the vehicle driver is physically contacting the other of the first electrically conductive lead 175 and the second electrically conductive lead 180, as shown in FIG. 3. For example, the touch sensors 120 could be optical, infrared, resistive, capacitive, surface acoustic wave, and/or thermal sensors. The touch sensors 120 may be embedded in and located around the circumference of the steering wheel 170. The touch sensors 120 can be programmed to output a right-hand detection signal when the right hand of the vehicle driver is physically contacting one of the first electrically conductive lead 175 and the second electrically conductive lead 180 and a left-hand detection signal when the left hand of the vehicle driver is physically contacting the other of the first electrically conductive lead 175 and the second electrically conductive lead 180. The right-hand detection signal and the left-hand detection signal may be output to the processor 140, the memory 135, etc.

Additionally or alternatively, the vehicle alert system 105 can include the image sensor 125, e.g., visible-light and infrared cameras, a CCD imager, a CMOS imager, etc. The image sensor 125 is implemented via chips, circuits, or other electrical components that can detect whether the right hand of the vehicle driver is physically contacting one of the first electrically conductive lead 175 and the second electrically conductive lead 180 of the steering wheel 170, and the left hand of the vehicle driver is physically contacting the other of the first electrically conductive lead 175 and the second electrically conductive lead 180. The image sensor 125 can be programmed to output a right-hand detection signal when the right hand of the vehicle driver is physically contacting one of the first electrically conductive lead 175 and the second electrically conductive lead 180, and a left-hand detection signal when the left hand of the vehicle driver is physically contacting the other of the first electrically conductive lead 175 and the second electrically conductive lead 180, to the processor 140, the memory 135, etc.

If, however, the first and the second electrically conductive leads 175, 180 are disposed on and extend around the circumference of the steering wheel 170 as discussed above, the touch sensors 120 and/or the image sensor 125 can be implemented via chips, circuits, or other electrical components to detect whether one of the right hand or the left hand of the vehicle driver is physically contacting the first electrically conductive lead 175 and the second electrically conductive lead 180. If so, the touch sensors 120 and/or the image sensor 125 can be programmed to output a hand detection signal when one of the left hand or right hand of the vehicle driver is physically contacting the first and the second electrically conductive leads 175, 180 to the processor 140, the memory 135, etc.

Additionally or alternatively, the vehicle alert system 105 can include the occupancy sensor 130. The occupancy sensor 130 is implemented via chips, circuits, or other electrical components that can detect whether the vehicle driver is physically contacting the first electrical lead 200 and the second electrical lead 205 of the vehicle seat assembly 185. The occupancy sensor 130 may be visible-light or infrared cameras directed at the vehicle seat assembly 185, weight sensors inside the vehicle seat assembly 185, sensors detecting whether a seat belt for the vehicle seat assembly 185 is buckled or unspooled, and/or other suitable sensors. The occupancy sensor 130 can be programmed to output an occupant detection signal when the vehicle driver is physically contacting the first electrical lead 200 and the second electrical lead 205 of the vehicle seat assembly 185, to the processor 140, the memory 135, etc.

The memory 135 of the vehicle alert system 105 is implemented via chips, circuits, or other electronic components that can store electronic data. The memory 135 may store, for example, various computer-executable instructions, including instructions that can be executed by the processor 140. Thus, the memory 135 may make such instructions available to the processor 140 and possibly other components of the host vehicle 100. FIG. 2 shows the memory 135 as a separate component of the vehicle alert system 105. As discussed below, however, the autonomous mode controller 160 can also include memory. The memory in the autonomous mode controller 160, and/or in any other device in the vehicle alert system 105 that includes memory, may be used for the vehicle alert system 105 as an alternative to or in addition to the memory 135. In some instances, the memory 135 may be incorporated into the processor 140.

The processor 140 is implemented via chips, circuits, or other electronic components programmed to access and execute the computer-executable instructions stored in the memory 135, and/or the memory in any other device in the vehicle alert system 105, such as the memory of the autonomous mode controller 160. In some possible approaches, the processor 140 also serves as the autonomous mode controller 160, or vice versa.

The processor 140 can be programmed to receive a handoff request from the autonomous mode controller 160 indicating the transition of the host vehicle 100 from the autonomous mode of operation to the non-autonomous mode of operation. The processor 140 may be programmed to output a notification signal to the vehicle component 110, the second vehicle component 115, or both, in response to receiving the handoff request. In response to receiving the notification signal, the vehicle component 110, and/or the second vehicle component 115, and/or both, may alert the vehicle driver to assume control of the host vehicle 100 as described in greater detail below. The processor 140 may be programmed to thereafter permit the transition of the host vehicle 100 from the autonomous mode of operation to the non-autonomous mode of operation if the processor 140 determines that the vehicle driver received the alert, or is otherwise aware of the handoff request.

When the processor 140 receives the handoff request, the processor 140 can be programmed to detect whether the right hand of the vehicle driver is physically contacting one of the first electrically conductive lead 175 and the second electrically conductive lead 180 of the steering wheel 170, and the left hand of the vehicle driver is physically contacting the other of the first electrically conductive lead 175 and the second electrically conductive lead 180. For example, the processor 140 can be programmed to receive the right-hand detection signal and the left-hand detection signal from the touch sensors 120 and/or the image sensor 125. If the processor 140 receives the left-hand and the right-hand detection signals, then the processor 140 can be programmed to output a notification signal to present the electric current via the steering wheel 170, as further discussed below.

When the processor 140 received the handoff request, and the first and the second electrically conductive leads 175, 180 are disposed on and extend around the circumference of the steering wheel 170, the processor 140 can be programmed to detect whether the left hand or the right hand of the vehicle driver is physically contacting the first and the second electrically conductive leads 175, 180. For example, the processor can be programmed to receive the hand detection signal from the touch sensors 120 and/or the image sensor 125. If the processor 140 receives the hand detection signal, then the processor 140 can be programmed to output a notification signal to present the electric current via the steering wheel 170, as further discussed below.

If, however, the processor 140 does not detect the left-hand or right-hand detection signals, or does not detect the hand detection signal in the alternative embodiment, then the processor 140 can be programed to detect whether the vehicle driver is physically contacting the first and second electrically conductive leads 200, 205 of the vehicle seat assembly 185. For example, the processor 140 can be programmed to receive the occupant detection signal from the occupancy sensor 130. If the processor 140 receives the occupant detection signal, then the processor can be programmed to output a notification signal to present the electrical current via the vehicle seat assembly 185, as further discussed below.

In response to the notification signal, the processor 140 can be programmed to close the switch 145. Closing the switch 145 will electrically connect the power source 155, e.g., a vehicle battery, to one of the first and the second electrically conductive leads 175, 180 of the steering wheel 170 to deliver the electrical current to the steering wheel 170 to alert the vehicle driver to assume control of the host vehicle 100.

That is, by closing the switch 145, the power source 155 creates a voltage differential between the first and second electrically conductive leads 175, 180. Thus, when the right hand of the vehicle driver is physically contacting one of the first and the second electrically conductive leads 175, 180 and the left hand of the vehicle driver is physically contacting the other of the first and second electrically conductive leads 175, 180, or the right or left hand of the vehicle driver are contacting the first and second electrically conductive leads 175, 180 in the alternative embodiment, then electric current will flow between the first and second electrical leads 175, 180, and at least partially through the vehicle driver.

The processor 140 may be programmed to thereafter permit the transition of the host vehicle 100 from the autonomous mode of operation to the non-autonomous mode of operation. For example, the processor 140 can be programmed to set a flag, such as a 1 or a 0. The autonomous mode controller 160 will check the flag to determine whether it can complete the transition from the autonomous mode of operation to the non-autonomous mode of operation. If the processor sets the flag to 1, the autonomous mode controller 160 will go forward with the transition. If the processor 140 sets the flag to 0, the autonomous mode controller 160 will abort the transition.

When the processor 140 receives the handoff request, and the processor 140 does not receive one or both of the right-hand detection signal and the left-hand detection signal, or the hand detection signal in the alternative embodiment, the processor 140 can be programmed to output the notification signal to the second vehicle component 115 to alert the vehicle driver to assume control of the host vehicle 100. Accordingly, the vehicle driver may still be alerted of the transition of the host vehicle 100 from the autonomous mode of operation to the non-autonomous mode of operation when the vehicle driver's hands are not on the steering wheel 170.

For example, in response to the handoff request and in the absence of one or both of the right-hand and left-hand detection signals, or the hand detection signal in the alternative embodiment, the processor can be programmed to close the second switch 150. If the vehicle seat assembly 185 is the second vehicle component 115, when the second switch 150 closes, then the power source 155 can be electrically connected to one of the first and the second electrically conductive leads 200, 205 to deliver the electrical current to the vehicle seat assembly 185, alerting the vehicle driver to assume control of the host vehicle 100. That is, by closing the second switch 150, the power source 155 creates a voltage differential between the first and the second electrically conductive leads 200, 205. Thus, when the vehicle driver is physically contacting the first and the second electrically conductive leads 200, 205, the electric current will flow between the first and second electrical leads 200, 205 at least partially through the vehicle driver. The processor 140 may be programmed to thereafter permit the transition of the host vehicle 100 from the autonomous mode of operation to the non-autonomous mode of operation, as discussed above.

It is to be understood, however, that a selection of the vehicle seat assembly 185 as the second vehicle component 115 can be contingent on the occupancy sensor 130 detecting whether the vehicle driver is physically contacting the first and second electrically conductive leads 200, 205 of the vehicle seat assembly 185. That is, if the processor 140 receives a handoff request and does not receive one or both of the right-hand and the left-hand detection signal, the processor 140 may be programmed to detect and receive the occupant detection signal from the occupancy sensor 130. If the processor 140 receives the occupant detection signal, then the processor 140 may be programmed to proceed as described in the preceding paragraph. If, however, the processor 140 does not receive the occupant detection signal, the processor 140 can be programmed to not permit the transition of the host vehicle 100 from the autonomous mode of operation to the non-autonomous mode of operation.

Rather than the vehicle seat assembly 185, the second vehicle component 115 may be implemented as a light, a speaker, or, as discussed above, the steering wheel assembly 165. With respect to the light and the speaker, for example, if the processor 140 receives a handoff request and does not receive the right-hand or the left-hand detection signal, the processor 140 may be programmed to output the notification signal to the second vehicle component 115 such that the light illuminates and/or the speaker emits an audible alert (e.g., a voice, a beep, or other type of alert) to alert the vehicle driver to assume control of the host vehicle 100.

The autonomous mode controller 160 may control all or some operations of the host vehicle 100 when the host vehicle 100 is in the autonomous mode, e.g., steering, accelerating, braking, etc. The autonomous mode controller 160 is a computing device that generally includes a processor and a memory, the memory including one or more forms of computer-readable media, and storing instructions executable by the processor for performing the various operations. The memory of the autonomous mode controller 160 further generally stores remote data received via various communications mechanisms; e.g., the autonomous mode controller 160 can communicate over a communication network 210 as shown in FIG. 2, such as a controller area network (CAN) bus and/or other wired or wireless protocols, e.g., Ethernet, Bluetooth®, Bluetooth® Low Energy, etc. In this way, the autonomous mode controller 160 may transmit messages to various devices in the vehicle, such as the processor 140, and receive messages from the various devices, e.g., processors, controllers, actuators, sensors, etc. For example, the autonomous mode controller 160 can output the handoff request indicating a transition of the host vehicle 100 from the autonomous mode of operation to the non-autonomous mode of operation.

Figure 5:
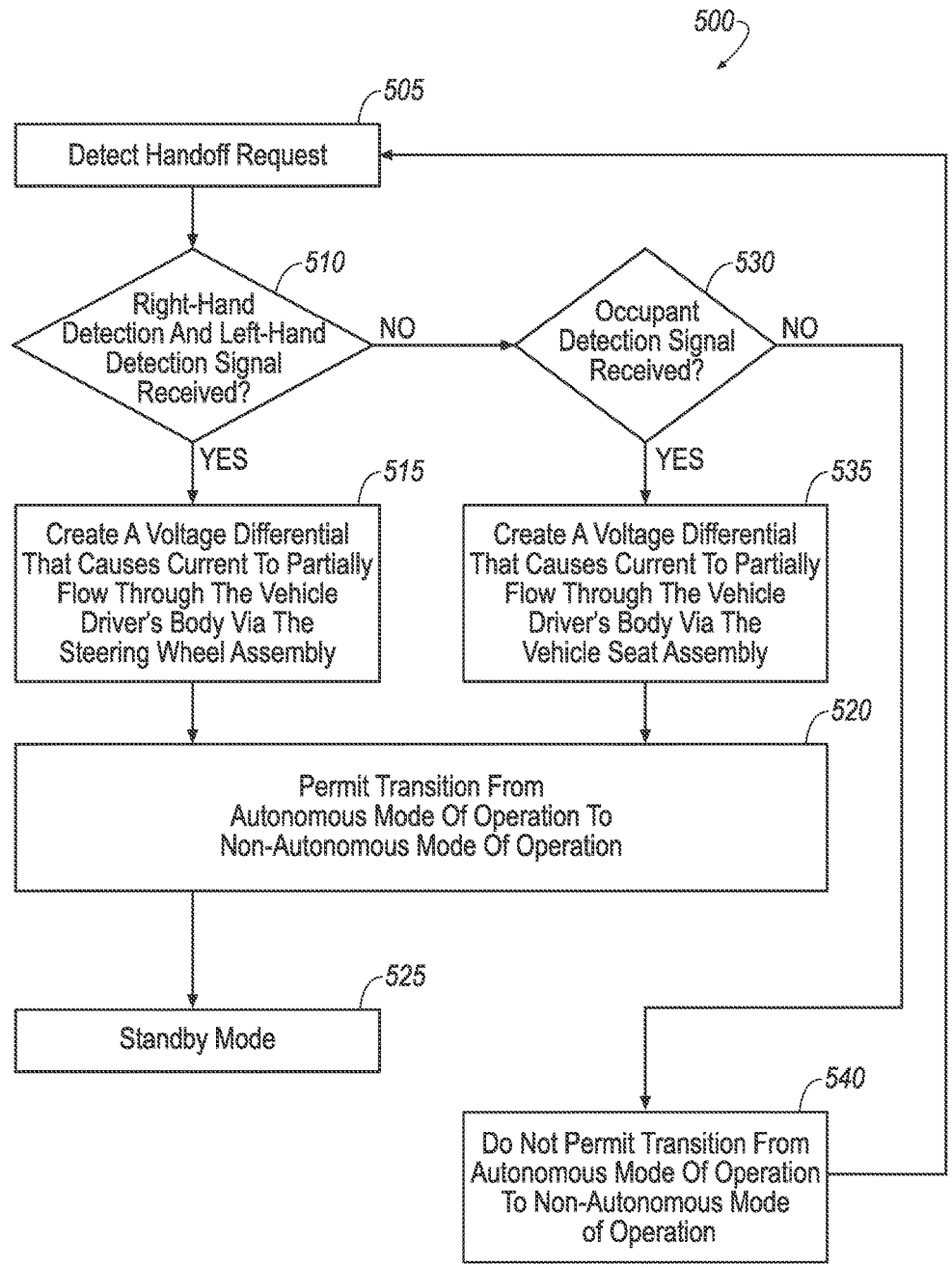
FIG. 5 is a flowchart of an example process that may be executed by the vehicle alert system of FIG. 1.

FIG. 5 is a flowchart of an example process 500 that may be executed by the vehicle alert system 105 while the host vehicle 100 is operating in the autonomous mode of operation. The process 500 may begin when the host vehicle 100 is started and operating in an autonomous mode. The process 500 may continue to execute until the host vehicle 100 is turned off, is no longer operating in an autonomous mode, or is no longer in a situation where a handoff could occur.

At block 505, the vehicle alert system 105 detects a handoff request. The handoff request may indicate that the host vehicle 100 is going to transition from the autonomous mode of operation to the non-autonomous mode of operation. Thus, the processor 140 detects the handoff request in accordance with a signal received from the autonomous mode controller 160. Following detection of the handoff requests, the process 500 proceeds to decision block 510.

At decision block 510, the vehicle alert system 105 determines whether the left hand of the vehicle driver is physically contacting one of the first and the second electrically conductive leads 175, 180 of the steering wheel, and the right hand of the vehicle driver is physically contacting the other of the first and the second electrically conductive leads 175, 180. If the processor receives both the left and right-hand detection signals, the process 500 proceeds to block 515. If only one or none of the left and right-hand detection signals are received, the process 500 proceeds to block 530.

For example, as discussed above, the touch sensors 120 embedded in the steering wheel 170 and/or the image sensor 125 can output the right-hand detection signal and the left-hand detection signal when the right hand of the vehicle driver is physically contacting one of the first electrically conductive lead 175 and the second electrically conductive lead 180, and the left hand of the vehicle driver is physically contacting the other of the first electrically conductive lead 175 and the second electrically conductive lead 180. The processor 140 may be programmed to detect and receive the right-hand detection signal and the left-hand detection signal, and output a notification signal in response.

If the processor receives both the right and the left-hand detection signals, the processer 500 proceeds to block 515. At block 515, the vehicle alert system 105 delivers electrical current to the steering wheel assembly 165 to alert the vehicle driver of the transition from the autonomous mode of operation to the non-autonomous mode of operation. For example, in response to the notification signal, the processor 140 can be programmed to output a control signal to close the switch 145. In this way, the power source 155 can be electrically connected to one of the first and the second electrically conductive leads 175, 180 of the steering wheel 170 to create a voltage potential between the leads 175, 180. The driver's hands on the steering wheel will cause an electric current to flow from one lead 175, 180 to the other 175, 180, at least partially through the vehicle driver's body, resulting in a mild electric shock delivered to the vehicle driver via the steering wheel assembly 165. For example, the electric shock can range from 1 to 5 milliamperes. Following block 515, the process 500 proceeds to block 520.

At block 520, the vehicle alert system 105 is programmed to permit the transition of the host vehicle 100 from the autonomous mode of operation to the non-autonomous mode of operation. As discussed above, the processor 140 sets a flag, such as a 1 or a 0. The autonomous mode controller 160 will check the flag to determine whether it can complete the transition from the autonomous mode of operation to the non-autonomous mode of operation. If the processor sets the flag to 1, the autonomous mode controller 160 will go forward with the transition to the non-autonomous mode of operation. Following block 520, the process 500 proceeds to block 525.

At block 525, the vehicle alert system 105 begins operating in a standby mode. At this point in the process 500, the handoff is complete and no further alerts may be needed from the vehicle alert system 105. Thus, the process 500 may effectively end until the host vehicle 100 begins to operate in the autonomous mode, in which case the process 500 may begin again at block 505.

As discussed above, if only one or none of the left and right-hand detection signals are received by the processor at decision block 510, then the process 500 proceeds to decision block 530.

At decision block 530, the vehicle alert system 105 determines whether the vehicle driver is physically contacting the first and second electrically conductive leads 200, 205 of the vehicle seat assembly 185. When the vehicle driver is physically contacting the first and second electrically conductive leads 200, 205 of the vehicle seat assembly 185, the occupancy sensor 130 is programmed to output an occupant detection signal. The processor 140 may be programmed to detect and receive the occupant detection signal, and output a notification signal in response. If the processor 140 receives the occupant detection signal, then the process 500 proceeds to block 535. If the processor does not receive the occupation detection signal, the process 500 proceeds to block 540.

At block 535, the vehicle alert system 105 delivers electrical current to the vehicle seat assembly 185 to alert the vehicle driver of the transition from the autonomous mode of operation to the non-autonomous mode of operation. For example, the processor 140 can be programmed to output a control signal to close the second switch 150 in response to the notification signal. When the second switch 150 closes, then the power source 155 is electrically connected to one of the first and the second electrically conductive leads 200, 205 to deliver the electrical current to the vehicle seat assembly 185. Following that, the process 500 may proceed to block 520.

At block 540, the vehicle alert system 105 does not permit the handoff to the non-autonomous mode of operation. For instance, if the occupant detection signal is not received at block 530, the processor 140 may be programmed to not permit the transition from the autonomous mode of operation to the non-autonomous mode of operation. That is, the processor 140 sets a flag, such as a 1 or a 0. The autonomous mode controller 160 will check the flag to determine whether it can complete the transition from the autonomous mode of operation to the non-autonomous mode of operation. If the processor 140 sets the flag to 0, the autonomous mode controller 160 will not go forward with the transition.

If the processor 140 does not permit the transition, the process 500 returns to block 505.

In general, the computing systems and/or devices described may employ any of a number of computer operating systems, including, but by not limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. One or more transmission media, including coaxial cables, copper wire and fiber optics, including the wires that comprise a system bus coupled to a processor of a computer, may transmit such instructions. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle alert system comprising:
    a processor programmed to receive a handoff request indicating a transition of a vehicle from an autonomous mode of operation to a non-autonomous mode of operation, and wherein the processor is programmed to output a notification signal in response to receiving the handoff request;
    a vehicle component configured to deliver an electrical current to a vehicle driver in response to receiving the notification signal to alert the vehicle driver of the transition to the non-autonomous mode of operation;
    wherein the processor is programmed to permit the transition to the non-autonomous mode of operation if a left hand and a right hand of the vehicle driver are in physical contact with a steering wheel.

2. The vehicle alert system of claim 1, wherein the vehicle component is a steering wheel assembly, the steering wheel assembly including:
    the steering wheel;
    a first electrically conductive lead extending at least partially through the steering wheel; and
    a second electrically conductive lead extending at least partially through the steering wheel and spaced from the first electrically conductive lead.

3. The vehicle alert system of claim 2, further comprising a power source electrically connected to at least one of the first and the second electrically conductive leads.

4. The vehicle alert system of claim 3, further comprising a switch, wherein the processor is programmed to output a control signal to close the switch to electrically connect the power source to at least one of the first and the second electrically conductive leads in response to the processor receiving the notification signal.

5. The vehicle alert system of claim 2, further comprising at least one sensor programmed to output a right-hand detection signal indicating that a right hand of the vehicle driver is physically contacting at least one of the first and the second electrically conductive leads and a left-hand detection signal indicating that a left hand of the vehicle driver is physically contacting the other of the at least one of the first and the second electrically conductive leads.

6. The vehicle alert system of claim 5, wherein the at least one sensor includes a plurality of touch sensors embedded in the steering wheel.

7. The vehicle alert system of claim 5, wherein the at least one sensor includes an image sensor.

8. The vehicle alert system of claim 5, wherein the processor is programmed to receive the right-hand detection signal and the left-hand detection signal and determine that the right hand of the vehicle driver is physically contacting the at least one of the first electrically conductive lead and the second electrically conductive lead and that the left hand of the vehicle driver is physically contacting the other of the first electrically conductive lead and the second electrically conductive lead in accordance with the right-hand detection signal and the left-hand detection signal, respectively.

9. The vehicle alert system of claim 5, wherein when the processor is programmed to permit the transition to the non-autonomous mode of operation if the left hand and the right hand of the vehicle driver are in physical contact with the first and the second electrically conductive leads, respectively.

10. The vehicle alert system of claim 5, further comprising a second vehicle component, wherein the processor is programmed to output the notification signal to the second vehicle component if at least one of the right hand and the left hand of the vehicle driver is not in physical contact with the first and the second electrically conductive leads, respectively.

11. The vehicle alert system of claim 10, wherein the second vehicle component includes at least one of a light and a speaker.

12. The vehicle alert system of claim 10, wherein the second vehicle component is a vehicle seat assembly, the vehicle seat assembly including:
 a seat back;
 a seat bottom;
 a first electrically conductive lead in at least one of the seat back and the seat bottom;
 a second electrically conductive lead in at least one of the seat back and the seat bottom and spaced from the first electrically conductive lead; and
 the first and the second electrically conductive leads configured to deliver an electrical current to the vehicle driver in accordance with the notification signal.

13. The vehicle alert system of claim 12, further comprising:
 a power source electrically connected to at least one of the first and the second electrically conductive leads; and
 a switch, wherein the processor is programmed to output a control signal to close the switch to electrically connect the power source to at least one of the first and the second electrically conductive leads in response to the processor receiving the notification signal.

14. The vehicle alert system of claim 1, wherein the vehicle component is a vehicle seat assembly, the vehicle seat assembly including;
 a seat back;
 a seat bottom;
 a first electrically conductive lead in one of the seat back and the seat bottom electrically connected to a power source;
 a second electrically conductive lead in one of the seat back and the seat bottom; and
 a switch, the processor programmed to close the switch to electrically connect the power source to the first electrically conductive lead when it receives the notification signal.

15. A method comprising:
 receiving a handoff request indicating a transition of a vehicle from an autonomous mode of operation to a non-autonomous mode of operation;
 outputting a notification signal in response to receiving the handoff request; and
 when a vehicle driver is in physical contact with a vehicle component, delivering an electrical current to the vehicle component in response to receiving the notification signal to alert a vehicle driver of the transition to the non-autonomous mode of operation and permitting the transition of the vehicle from the autonomous mode of operation to the non-autonomous mode of operation.

16. The method of claim 15, further comprising selecting whether to deliver the electrical current to the vehicle component or a second vehicle component.

17. The method of claim 16, wherein delivering the electrical current includes delivering the electrical current to the second vehicle component when the vehicle driver is not in physical contact with the vehicle component.

* * * * *